(No Model.)

C. W. DE MOTT.
PRIMARY BATTERY.

No. 530,260. Patented Dec. 4, 1894.

WITNESSES.
O. F. Morgan
J. S. Lockwood

INVENTOR.
Chas. W. De Mott.
By A. P. Thayer.
atty.

UNITED STATES PATENT OFFICE.

CHARLES W. DE MOTT, OF NEW YORK, N. Y.

PRIMARY BATTERY.

SPECIFICATION forming part of Letters Patent No. 530,260, dated December 4, 1894.

Application filed December 7, 1893. Serial No. 492,973. (No specimens.)

*To all whom it may concern:*

Be it known that I, CHARLES W. DE MOTT, a citizen of the United States, and a resident of New York city, in the county and State of New York, have invented certain new and useful Improvements in Primary Batteries, of which the following is a specification.

My invention relates to batteries in which a perforated copper tube is used for the copper element, and it consists of an improved construction of the same affording ample circulation of the solution without diminishing the area of effective surface of the tube, as hereinafter fully described, reference being made to the accompanying drawings, in which—

Figure 1:
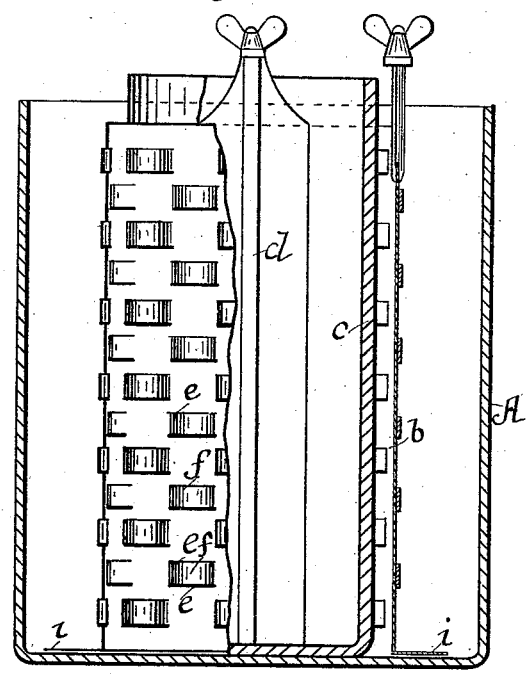
Figure 2:
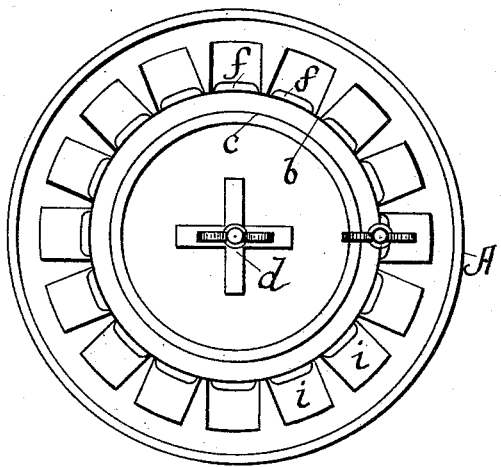

Figure 1, is a sectional elevation of my improved battery. Fig. 2, is a plan view, and Fig. 3, is a detail showing a detached part of the copper element in perspective view.

A represents the jar; $b$, the copper electrode; $c$, the porous cup, and $d$ the zinc electrode.

Figure 3:
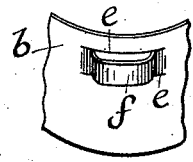

My improvement in perforating the copper tube so as to afford circulation of the solution without diminishing the effective surface of the tube consists in making numerous parallel slits as $e$, and forcing the narrow strips $f$ between the slits laterally to the plane of the rest of the tube to open passages at the edges of said strips as seen best in Fig. 3, preferring to force said strips outward radially, but they may be forced inwardly if desired.

In this example I represent the slits as made circumferentially of the tube but for the flange to center the copper tube in the jar I make numerous slits in the lower end about the length of the desired width of the flange and bend the parts $i$ between the slits outward as shown in Figs. 1 and 2, and thus provide the centering flange more simply and cheaply than by making a separate continuous flange and securing it to the end of the tube as commonly done.

I am aware that metallic lathing sheets have been made with like slitted and bent strips, and I do not claim such device broadly.

I claim—

The combination in a primary battery of the jar, the porous cup, the zinc electrode and a copper electrode having the parallel slits and the strips between the slits bent out of the plane of the rest of the tube whereby circulating passages are provided for the solution without lessening the surface area of the copper electrode.

Signed at New York city, in the county and State of New York, this 13th day of November, A. D. 1893.

CHARLES W. DE MOTT.

Witnesses:
W. J. MORGAN,
J. S. LOCKWOOD.